April 26, 1960 C. G. LEHR 2,934,675

MAGNETRON TUNING

Filed Nov. 10, 1955 2 Sheets-Sheet 1

INVENTOR.
Carlton G. Lehr
BY Wade Koontz and
Martin J. Finnegan
ATTORNEYS

April 26, 1960 C. G. LEHR 2,934,675

MAGNETRON TUNING

Filed Nov. 10, 1955 2 Sheets-Sheet 2

INVENTOR.
Carlton G. Lehr
BY Wade Koontz, Jr.
Martin J. Finnegan
ATTORNEYS

United States Patent Office 2,934,675

Patented Apr. 26, 1960

2,934,675

MAGNETRON TUNING

Carlton G. Lehr, Waltham, Mass., assignor to the United States of America as represented by the Secretary of the Air Force Application November 10, 1955, Serial No. 546,297

2 Claims. (Cl. 315—39.61)

This invention relates to magnetrons, and particularly to the control of the range of output frequencies obtainable by mechanical adjustment of the dimensions governing the inductance and capacitance characteristics of the cavity-forming areas of a magnetron.

The invention is characterized by the provision of novel means for linking two sets of cavity-varying tuning elements in such manner that no part of the linking structure is required to enter the working, or energy-generating, region of the magnetron, in any position to which the tuning mechanism may be adjusted.

More specifically, the invention provides two sets of tuning sectors, each set equal in number to the number of sector-shaped cavities constituting the resonant cavity array, and a set of rods linking said two sets of tuning sectors to effect their alternate entry into and withdrawal from said cavities, in reciprocal fashion; the linking rods being disposed in recesses formed in the anode structure surrounding the resonant cavities, but physically shielded therefrom, wherefore said rods do not lower the operating efficiency of the magnetron by diversion of R.-F. energy therefrom. As a result, a magnetron embodying the tuning arrangement of the present invention will have a higher power generating efficiency than prior art devices wherein the corresponding linking rods occupied space within the compass of the resonant cavities themselves. The tuning range, heat dissipation qualities, mechanical rigidity, and sturdiness, are also improved.

These and other characteristics and advantages of the invention will become more apparent upon reference to the following detailed description of the embodiment of the invention illustrated in the accompanying drawings wherein.

Figure 1:
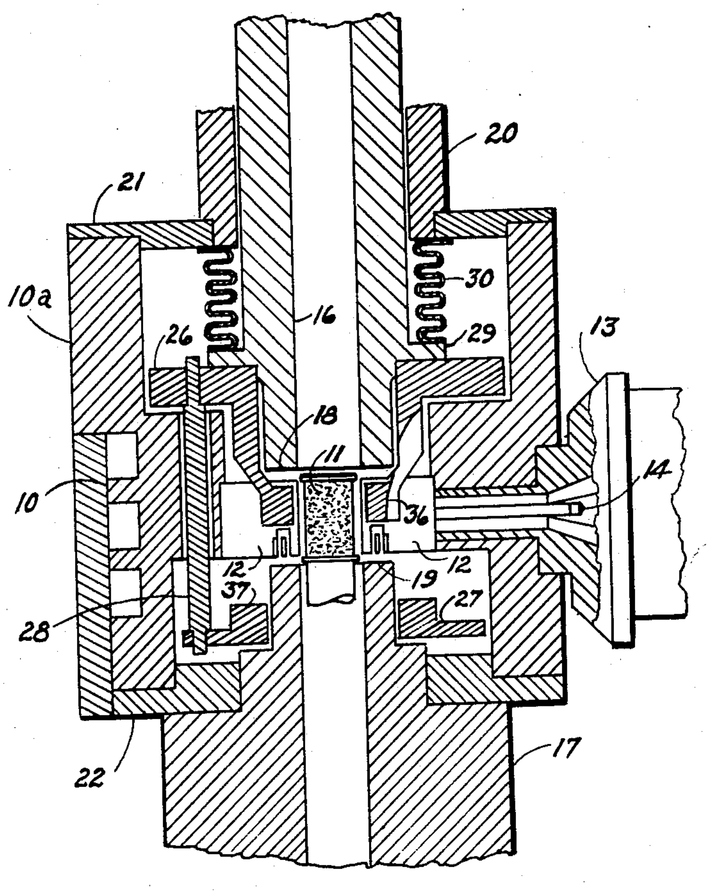
Fig. 1 is a longitudinal sectional view of a magnetron embodying the invention.

Referring first to Fig. 1, reference numerals 10 and 10*a* designate, respectively, the anode block and the block extension, numeral 11 the cathode, and 12 the radially disposed vanes of a multi-cavity magnetron adapted to deliver energy, at radio-frequencies, to an output coupling 13, by way of coaxial line 14 having the usual end-loop connection (not shown) to the inner cylindrical surface of the anode block 10, at a point on said surface that lies between two of the vanes 12 defining one of the resonant cavities.

The resonant cavities are disposed in the path of the magnetic flux generated in the magnetic circuit extending between pole-pieces 16 and 17 of a magnetic assembly, so that high frequency currents are generated in the cavities by reason of the exciting effect of the magnetic field joining the pole tips 18 and 19 of the pole-pieces 16 and 17, respectively, when said field is supplemented by electronic emission from cathode 11, to which energizing current is delivered by conventional currentdelivery means (not shown) passing along the central bore of pole-piece 17. A third part of the magnetic assembly is constituted by tubular piece 20 surrounding pole-piece 16 and—like pole-piece 17—forming part of the stationary structure embracing the anode block 10, to which it attaches by way of end-cap 21.

The novel tuning arrangement of the present invention includes a pair of circular plates 26 and 27 of current-conducting but non-magnetic material, disposed on opposite sides of the resonant cavity region, and in axial alignment therewith; also a set of linking rods 28 joining said plates 26 and 27 at angularly spaced points near the peripheries of said plates; also the movable pole-piece or plunger, 16, described above. The upper end (not shown) of plunger 16 carries a threaded sleeve or nut, or equivalent means for causing axial movement of plunger 16 for the purpose of adjusting the output frequency of the magnetron. Flange 29 of plunger 16 has its lower surface welded or otherwise bonded to the surface of plate 26, and its upper surface has secured thereto the lower end of a bellows type of corrugated tube 30 whose upper end is similarly secured to the under surface of end-cap 21. Hermetic sealing is thus insured.

Figure 2:
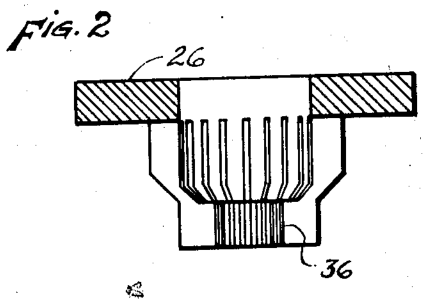
Figs. 2 and 3 are, respectively, sectional and plan views of one of the tuning assemblies.
Figure 3:
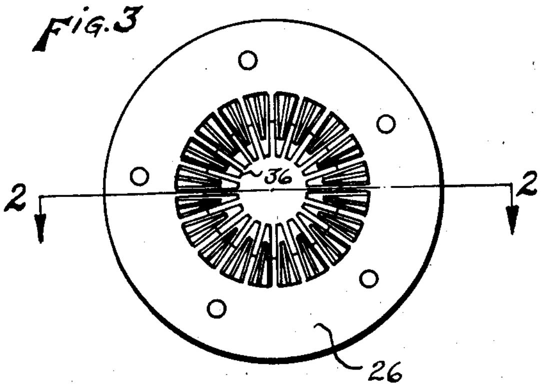
Figure 5:
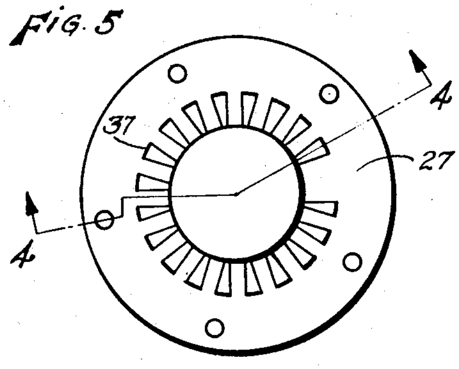
Figs. 4 and 5 are, respectively, sectional and plan views of the other of the tuning assemblies.
Figure 4:
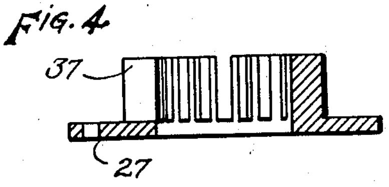

Plate 26 is provided with a plurality of axially extending segments 36, shown best in Figs. 2 and 3, that reach into the area embraced by the cavity-defining vanes 12, and function as capacitance-varying elements with respect to the resonant cavities; the segments 36 being so spaced as to register with the successive cavities, and pass closely to, but not actually touch, the walls of the inter-digitated vanes 12. A similar inter-digitation occurs between vanes 12 and the axially extending inductance-varying segments 37 of the plate 27, which segments are shown best in Figs. 4 and 5.

Fig. 1 shows the above-described L.-C. tuning assembly at one extremity of its range of movement, the illustrated position being the position of minimum resonant frequency. As the plunger is raised, segments 36 are drawn out of the cavities, and the resonant frequency increases correspondingly. At the point where the segments just clear the upper edges of the vanes 12, the frequency is approximately that which would be obtained if there were no tuning apparatus provided. As upward motion continues, the inductance controlling segments 37 move into the cavity array, resulting in a further increase in frequency.

The positioning of the linking rods 28 beyond the compass of the cavities, and physically shielded from the electromagnetic field by the non-magnetic metal of the anode block itself, results in the following advantages:

(1) Due to non-interference with the electromagnetic field established in the resonant cavities, and the isolation of the rods 28 from the currents which circulate about the peripheral areas of the cavities, the said rods do not dissipate R.-F. power to a degree that is in any respect comparable to the power losses sustained when tuning rods enter the resonant cavities.

(2) The lower tuning assembly can be supported more rigidly, due to the wider diameter of the circle upon which the linking rods are located, and due to their being unrestricted by the contours of the resonant cavities.

(3) The use of linking rods of greater cumulative cross-sectional area provides greater thermal conductance between the upper and lower tuning assembly, hence better heat dissipation.

(4) The absence of interfering metal in the resonant cavities facilitates the designing of the cavities for optimum tuning range.

While the invention has been described as applied to a magnetron of the multiple vane type, defining multiple cavities having a single coaxial output line, it will be understood that magnetrons and R.-F. wave or pulse generators of other designs, and delivering energy to coaxial lines or to waveguides, with or without coaxial line intervention, may embody the disclosed invention. Similarly, the invention may be applied to tuning arrangements other than those of the L.-C. type, as, for example, purely L or purely C tuning. In fact, the invention is not limited to any of the disclosed details, except insofar as indicated in the appended claims.

What is claimed is:

1. In a high frequency energy generator, an anode block having a cylindrical recess defining the resonant cavity region thereof, a tuning element movable into said recess from a space beyond said recess, in one axial direction, a second tuning element movable into said recess from a space beyond said recess, in the opposite axial direction, and means disposed radially of said recess, and beyond the periphery thereof, for linking said tuning elements in such manner that no part of the linking structure is required to enter the energy-generating cavity region.

2. In a high frequency energy generator, an anode block having a cylindrical recess defining the resonant cavity region thereof, a tuning element movable into said recess from a space beyond said recess, in one axial direction, a second tuning element movable into said recess from a space beyond said recess, in the opposite axial direction, and means disposed radially of said recess, and beyond the periphery thereof, for linking said tuning elements, said linking means comprising rods mounted for endwise motion within said anode block without in any degree impinging upon the working area of the resonant cavity region.

References Cited in the file of this patent

UNITED STATES PATENTS

| | | |
|---|---|---|
| 2,424,496 | Nelson | July 22, 1947 |
| 2,449,794 | Steele | Sept. 21, 1948 |
| 2,477,633 | Litton | Aug. 2, 1949 |